United States Patent [19]

Chujoh et al.

[11] Patent Number: 5,416,521
[45] Date of Patent: May 16, 1995

[54] VARIABLE-RATE VIDEO CODING APPARATUS FOR MAINTAINING A DESIRED AVERAGE BIT-RATE

[75] Inventors: Takeshi Chujoh; Hideyuki Ueno, both of Tokyo, Japan

[73] Assignee: Toshiba Corporation, Tokyo, Japan

[21] Appl. No.: 71,182

[22] Filed: Jun. 2, 1993

[30] Foreign Application Priority Data

Jun. 3, 1992 [JP] Japan .................................. 4-143030

[51] Int. Cl.$^6$ ...................... H04N 11/02; H04N 11/04
[52] U.S. Cl. ...................................... 348/411; 348/409
[58] Field of Search ....................... 358/133, 135, 136; H04N 7/133, 11/02, 11/04; 348/409, 411

[56] References Cited

U.S. PATENT DOCUMENTS 5,155,593  10/1992  Yonemitsu et al. .................. 358/133

FOREIGN PATENT DOCUMENTS 2-305284  12/1990  Japan .............................. H04N 7/13
3178286    8/1991  Japan ............................. H04N 7/133
4369192   12/1992  Japan ............................. H04N 7/133

OTHER PUBLICATIONS

"Impacts of Average Bitrate Policing on Video Transmission in ATM Networks", TomoakiTanaka, Sakae Okubo, IE 92-15, pp. 21-27.

Primary Examiner—James J. Groody
Assistant Examiner—Cheryl Cohen
Attorney, Agent, or Firm—Graham & James

[57] ABSTRACT

A video coding apparatus comprises a coding section and a control section. The coding section codes video signal input on a frame basis according to plural coding methods which vary between frames. The coding methods are repeated at a period which is an integral divisor of a window which contains plural frames. The control section restricts a number of bits of the video signal corresponding to the window size, coded by the coding section, below predetermined value according to a target number of bits set in accordance with the kind of frame.

7 Claims, 15 Drawing Sheets

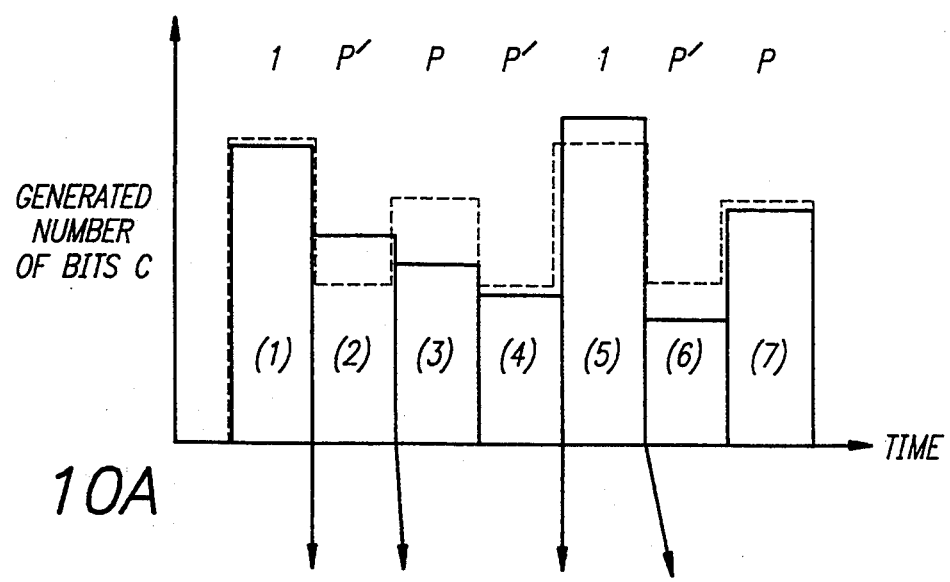
FIG. 10A
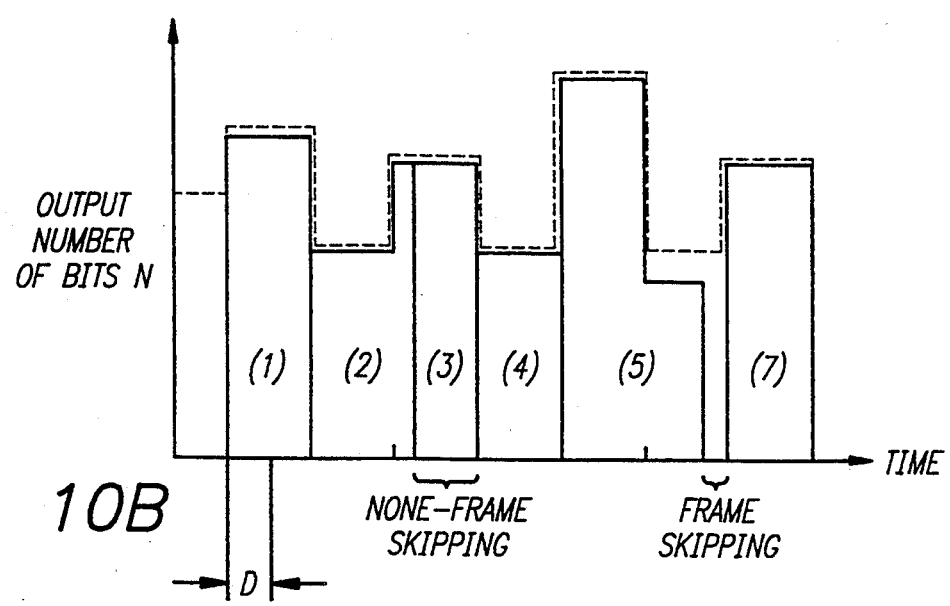
FIG. 10B
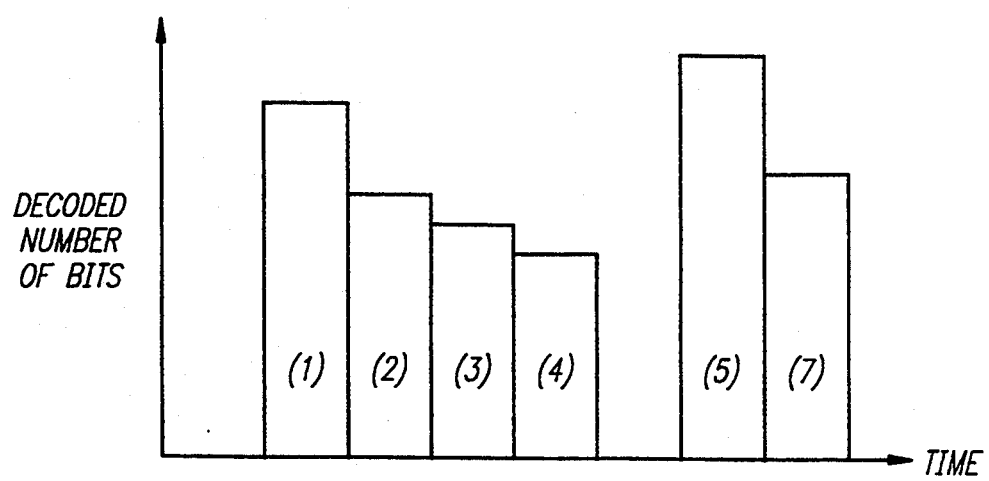
FIG. 10C    ------- TARGET NUMBER OF BIT S

VARIABLE-RATE VIDEO CODING APPARATUS FOR MAINTAINING A DESIRED AVERAGE BIT-RATE

FIELD OF THE INVENTION

The present invention relates to a video coding apparatus for coding video signals in units of a frame according to a variable-rate coding method.

BACKGROUND OF THE INVENTION

Recently, digitally coded video data has been transmitted by using a network for transmitting data at variable-rate, for example ATM (asynchronous transfer mode). If the network transmits the video data regardless of a number of bits, its transmission delay is low and its picture quality is fixed. But in actual use, the user side (coding apparatus side) declares a parameter value of transmission bits (for example, average bit-rate) to the network side because of traffic control, and the network side monitors whether the user side keeps a declared value or not by using UPC (Usage Parameter Control). Therefore, the user side needs to control the number of bits of video coded data to keep the declared value.

In prior art UPC methods, the use of a sliding window technique is well known as shown in FIG. 1. In the sliding window, a window whose phase is slid by a unit of one frame (or alternatively one field) is set and an average bit-rate in each window is restricted below the declared value.

FIG. 2 shows a block diagram of a prior art variable-rate video coding apparatus for a sliding window. In this apparatus, a number of bits of coded data in the window is summed, and an average bit-rate of coded data is restricted below the declared value by feedback control. In FIG. 2, an input video signal is coded by a coder 1. The coded data from the coder 1 is supplied to a number of bits sum section 2. The number of bits sum section 2 sums the number of bits of coded data in the window. The number of bits information 3 is then input to a variable-rate control section 4. The variable-rate control section 4 compares the number of bits information 3 with a target value and outputs a control information 5. According to the control information 5, the number of bits of coded data from the coder 1 (in short, transmission rate) is variably controlled. In comparison with a video coding method of fixed-rate, a video coding method of variable-rate is effective for transmission because its decoding delay (delay time from input of coding apparatus to output of decoding apparatus) is short. Concrete examples of variable bit rate video transmission are disclosed in Japanese Patent Disclosure (Kokai) No. H2-305284 and IEICE Tech. Rep. IE92-15 pp. 21-27 (May 22, 1992).

A disadvantage in the variable-rate control section of FIG. 2 is that even if the target value (average bit-rate) coincides with the declared value (declared average bit-rate), it happens that the actual number of bits of a particular frame (or field) will be above the declared value. In this case, because of the restriction of the sliding window technique that the average bit-rate in each window is restricted below the declared value, coded data of some frames (or fields) must be transmitted with a low bit-rate. Therefore, as shown in FIG. 3A, it can happen that the number of bits of coded data which can be transmitted fluctuates by a period equal to the window size. To cope with this, there is a method in which a target average bit-rate in a window is below the declared average bit-rate, as illustrated in FIG. 3B. In this method, the actual average bit-rate (possible number of bits of coded data which may be transmitted) is low in comparison with the declared average bit-rate and there is no periodic fluctuation.

Separate from the above, in a predictive coding method of video coding, the number of bits of coded data for each frame is different. FIG. 4A shows a prior art predictive structure for a video coding method used for storage media (VTR etc.). A GOP (group of pictures) consists of a frame of intra coded data (I picture) 41, frames of forward predictive coded data or coded data (P picture) 42, and frames of bidirectional predictive coded data or forward predictive coded data or backward predictive coded data or intra coded data (B picture) 43. As for the picture and B picture, the other kind of frame which is referenced by the P picture and B picture is determined by coding efficiency. In general, the number of bits of each picture meets the relationship "I>P>B". As an example of such video coding method, a standard method of MPEG (ISO/IEC JTC1/SC2/WG11 MPEG 90/176, Coding of Moving Picture For Digital Storage Media) is well known.

The video coding method as shown in FIG. 4A has the drawback that decoding delay is relatively long because the B picture is predicted by reference to a future frame. In contrast, FIG. 4B shows a predictive structure of a frame of forward predictive coding or intra coding from plural past frames instead of a B picture. In this predictive coding method, GOP includes nonreference frames (P' picture) 44 for predictive coding of other frames and decoding delay is low. Therefore, coded data of a video coding method as shown in FIG. 4B is transmitted at a variable-rate whose decoding delay is low.

In the video coding apparatus of variable-rate shown in FIG. 2, it happens that the number of bits of coded data that can be transmitted fluctuates by a period corresponding to window size as mentioned above. Accordingly, for a frame (or field) whose number of coded bits is large, it is necessary that picture quality of the frame is reduced or the frame is skipped because only a small number of bits for the frame can be transmitted.

SUMMARY OF THE INVENTION

The present invention provides a system which maximizes variable-rate coding performance. The invention operates to restrict the average bit-rate of coded data in a window below the declared value without picture degradation and without frame skipping. This is accomplished by a video coding apparatus for coding a video signal input in units of frames or fields, according to one of plural different coding methods corresponding to the kind of frame or field, where the coding methods are repeated at a period which is equal to or an integer divisor of window size corresponding to plural frames or fields. Control means provided for restricting a number of bits of the video signal coded by the coding means to below a predetermined value according to target number of bits set separately for each kind of frame or field so as to not exceed the average bit rate for each window. By separately setting a target bit-rate for each respective frame or field in accordance with the coding method for the particular frame or field, coding performance is maximized.

BRIEF DESCRIPTION OF THE DRAWINGS

FIGS. 10A, 10B and 10C are time graphs showing a relation between frame skipping and decoding delay according to the first embodiment of the present invention;

DESCRIPTION OF THE PREFERRED EMBODIMENTS (Basic principle of the invention)

In the present invention, a coding method sequence corresponding to the kind of frame is repeated at a period which is an integral divisor of a window containing plural frames or fields and a target number of bits of coded data is set for each frame or field according to the respective coding method. The number of bits of coded data in a window is restricted below a declared value.

The following discussion is made with reference to coding based upon frames. However, the invention is equally applicable to coding based upon fields. First, it is assumed that the number of frames transmitted per second is F (frame/sec), the average bitrate of the declared value is R (bit/sec), the window size is W (frames) and the number of bits of coded data of each frame corresponding to the first W frames is fi (bits) (i=1, ..., W). This relation is represented as follows:

$$\sum_{i=1}^{W} f_i = W \cdot R/F \quad (1)$$

In this case, to transmit coded data at the average bit-rate R(bit/sec) according to the restriction of a sliding window, the number of bits "$f_{2'1}, f_{w+2}...$" of coded data of each succeeding frame "(W+1), (W+2), ..." following the initial window is represented as follows:

$$f_{w+1} = W \cdot R/F - \sum_{i=2}^{w} f_i = f_1 \quad (2)$$

$$f_{w+2} = W \cdot R/F - \sum_{i=3}^{w+1} f_i = f_2 \quad (3)$$

That is, the bit number for each new frame in each successive sliding window is equal to the bit number of the first frame of the preceding window. If the above-formulas are generalized, formula (4) below is obtained. In short, the same transmission bit-rate per frame is repeated with a period of the window size W.

$$f_{(n.w)+1} = f_1 \text{ (i=1, ..., w, n: arbitrary natural number)} \quad (4)$$

Accordingly, if the target number of bits for a window is set below the average bit-rate and the target number of bits of coded data of each successive frame is repeated by a period which is equal to or an integer divisor of the window size (i.e., the window divided by the period equals an integer), the rate of coded data is repeated at a period corresponding to size. Therefore, with respect to a frame whose number of bits of coded data is large, the situation that only a small number of bits is able to be transmitted is avoided.

(First embodiment)

Figure 5:
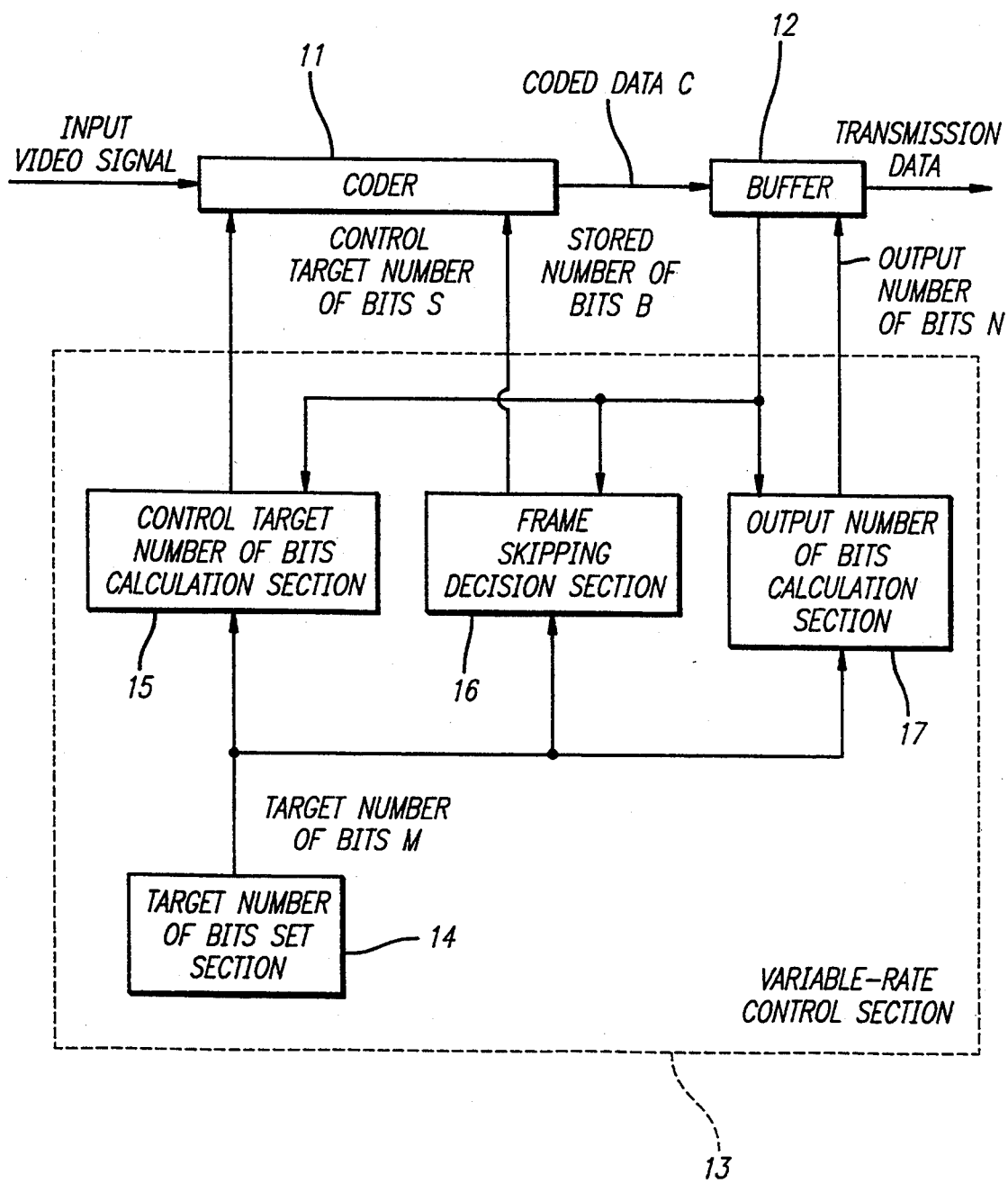
FIG. 5 is a block diagram of a video coding apparatus according to the first embodiment of the present invention.

FIG. 5 is a block diagram of a video coding apparatus according to the first embodiment of the present invention. It employs a video coding in which different predictive coding methods are used for different frames, applied to a variable-rate video coding apparatus. In FIG. 5, the video coding apparatus comprises a coder 11 which codes a video signal input by a unit of a frame, a buffer 12 which temporarily stores coded data from the coder 11 and outputs the coded data as transmission data to a transmission path, and a variable-rate control section 13 which controls a number of bits of coded data from the coder 11.

The variable-rate control section 13 controls the number of bits of each frame until the end of the input video signal. The variable-rate control section 13 comprises a target number of bits set section 14 which sets the target number of bits M, a control target number of bits calculation section 15 which calculates a control target number of bits S, a frame skipping decision section 16 and an output number of bits calculation section 17 which calculates the output number of bits N. The target number of bits M is a target value of the number of bits which is previously set for each successive frame and it is supplied to the control target number of bits calculation section 15, the frame skipping decision section 16, and the output number of bits calculation section 17. The control target number of bits S is supplied to the coder 11 and is a control target value of the number of bits C for coded data which is output from the coder 11. The output number of bits N is supplied to the buffer 12 and is the number of bits of transmission data which is output from the buffer 12 by a unit of each frametime.

Figure 1:
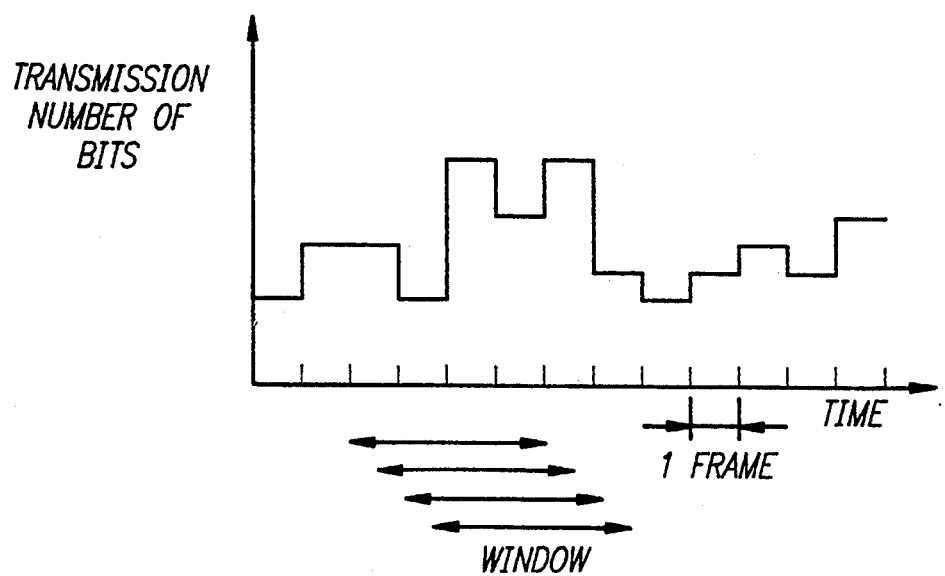
FIG. 1 is a time graph illustrating a sliding window method.
Figure 2:
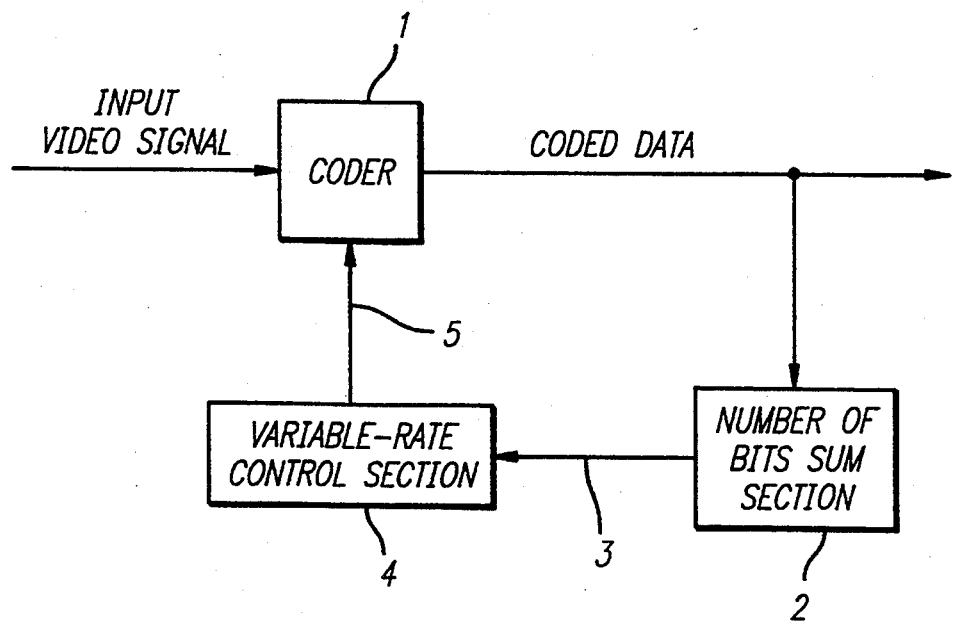
FIG. 2 is a block diagram of a prior art variable-rate video coding apparatus.
Figures 3A, 3B:
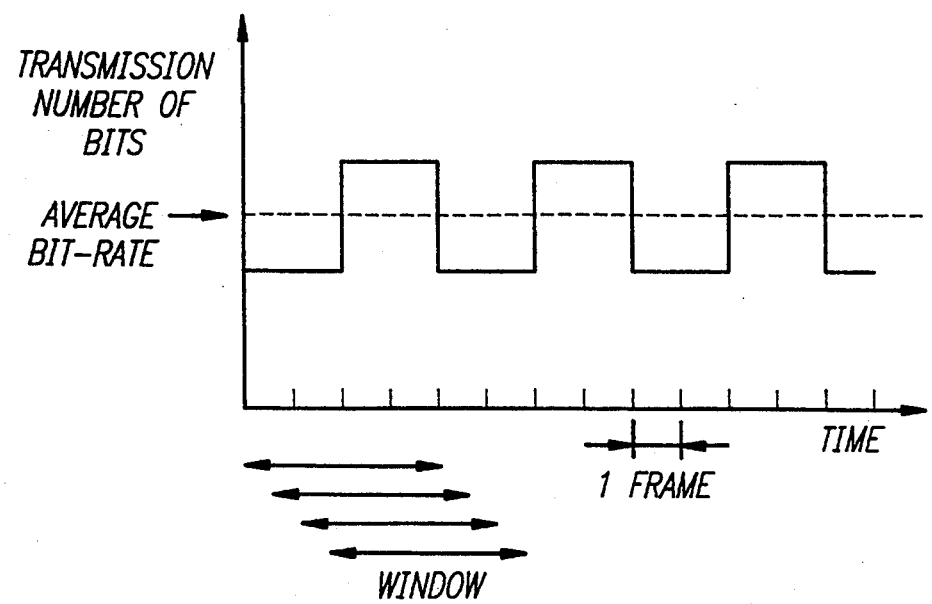
FIG. 3A is a time graph showing defect of a prior art sliding window method.
FIG. 3B is a time graph showing a defect of another prior art sliding window method.
Figure 4A:
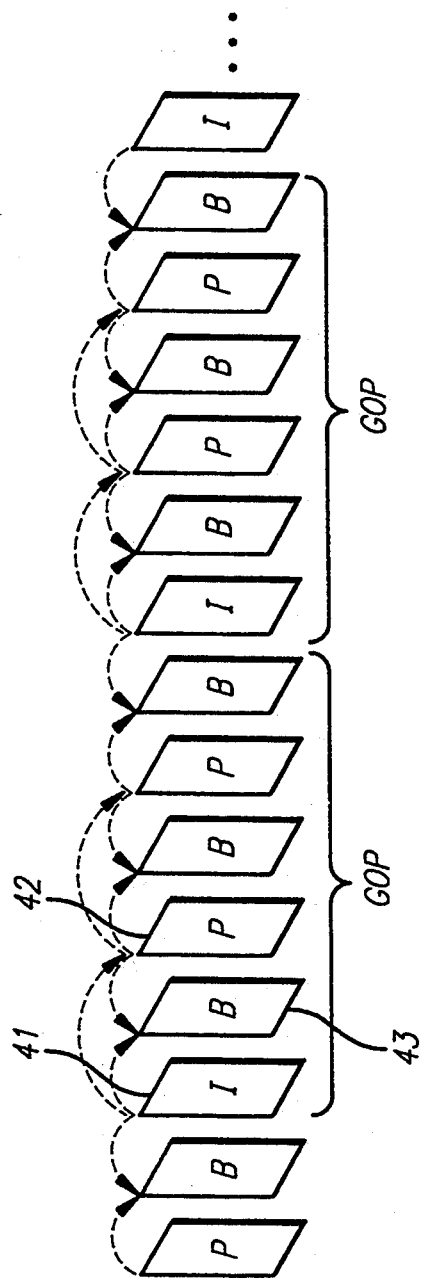
FIG. 4A illustrates a predictive structure of one predictive coding method of video coding.
Figure 4B:
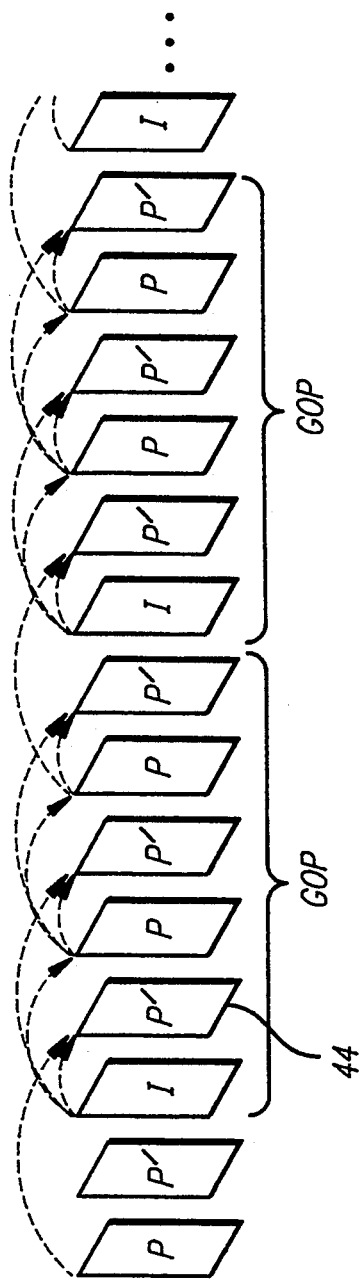
FIG. 4B illustrates a predictive structure of another predictive coding method of video coding.
Figure 6:
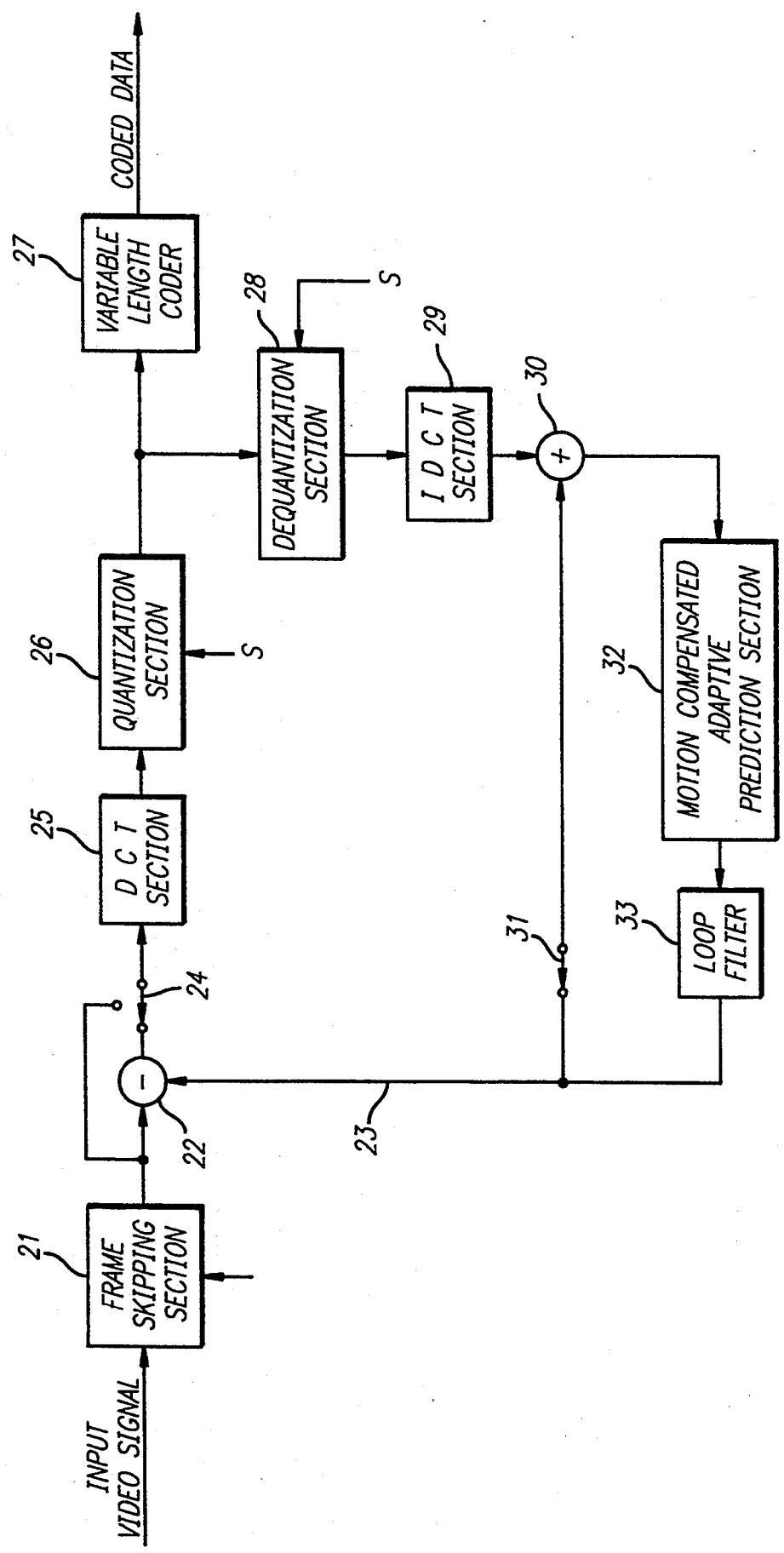
FIG. 6 is a block diagram of a coder of FIG. 5.

FIG. 6 is a block diagram of the coder 11. In FIG. 6, the input video signal is supplied to a subtractor 22 through a frame skipping section 21. The subtractor 22 subtracts the input video signal from a prediction video signal 23 and outputs a prediction error signal. A switch 24 selects either the prediction error signal or the input video signal from the frame skipping section 21. The selected signal is discrete cosine transformed by a DCT (discrete cosine transform) section 25. A DCT coefficient data from the DCT section 25 is quantized by a quantization section 26. This quantization signal is diverged and one path is coded by a variable length coder 27. The coded data from the variable length coder 27 is input to the buffer 12 shown in FIG. 5. On the other hand, the signal on the other path is processed by a dequantization section 28 and an IDCT (inverse discrete cosine transform) section 29 (which are reverse processes of the quantization section 26 and the DCT section 25, respectively). An adder 30 adds the signal from the IDCT section 29 and the prediction video signal from a switch 31. The adder 30 outputs local decoded signal. The local decoded signal is input to motion compensated adaptive prediction section 32 (which includes a moving vector detection circuit and frame memory) and a loop filter 33. The loop filter 33 outputs the prediction video signal on line 23. The motion compensated adaptive prediction section 32 selects one of the prediction methods shown in FIG. 4A and 4B according to the frame of the input video signal.

The control target number of bits S from the control target number of bits calculation section 15 shown in FIG. 5 is supplied to the quantization section 26 and the dequantization section 28 shown in FIG. 6. The control target number of bits S is a control signal indicating quantization step size. The coding rate is variably controlled by the quantization step size. The output signal of the frame skipping decision section 16 shown in FIG. 5 is supplied to the frame skipping section 21 shown in FIG. 6.

Figure 7:
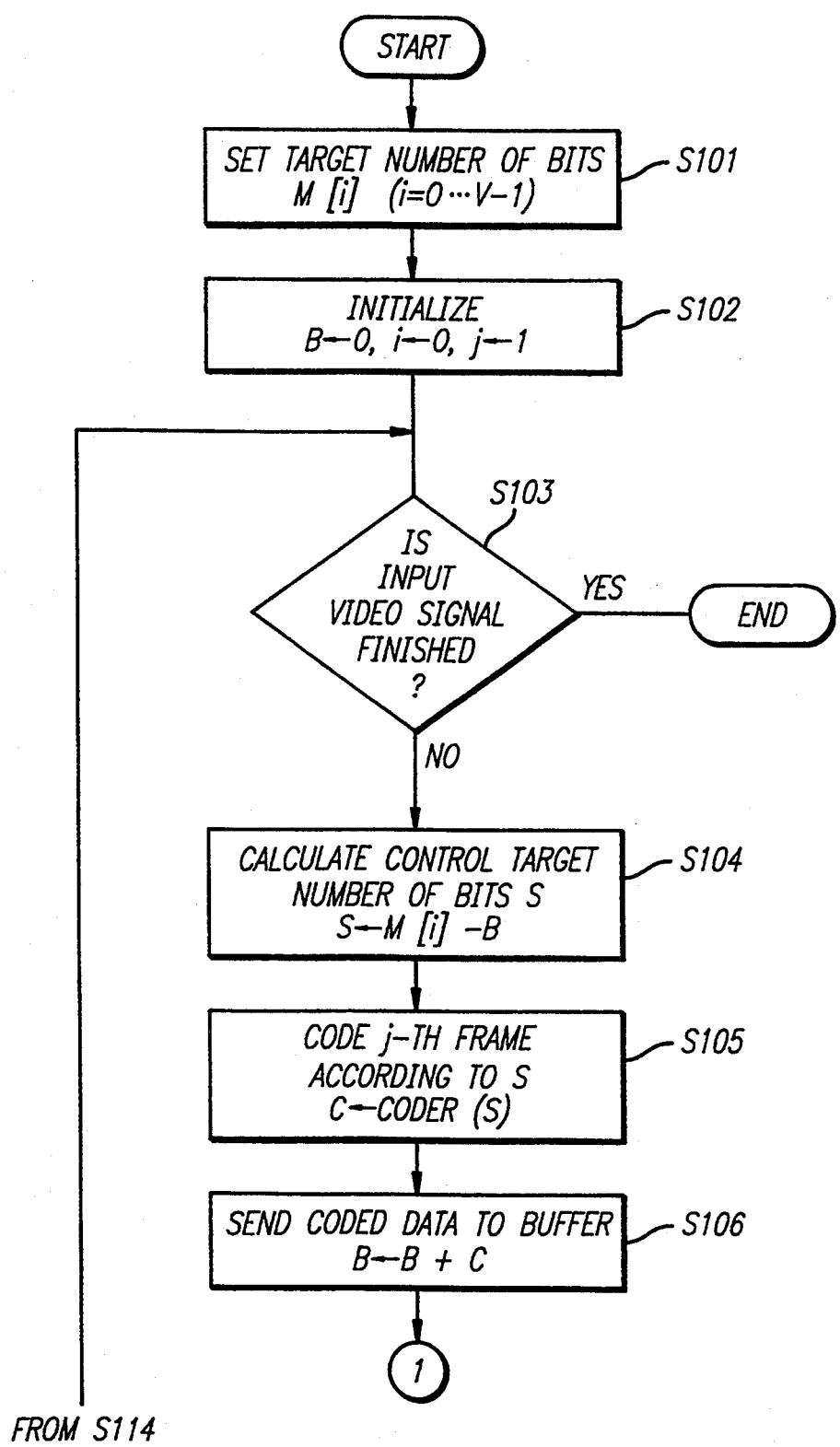
FIG. 7 is a first part of a flow chart of the video coding apparatus according to the first embodiment of the present invention.
Figure 8:
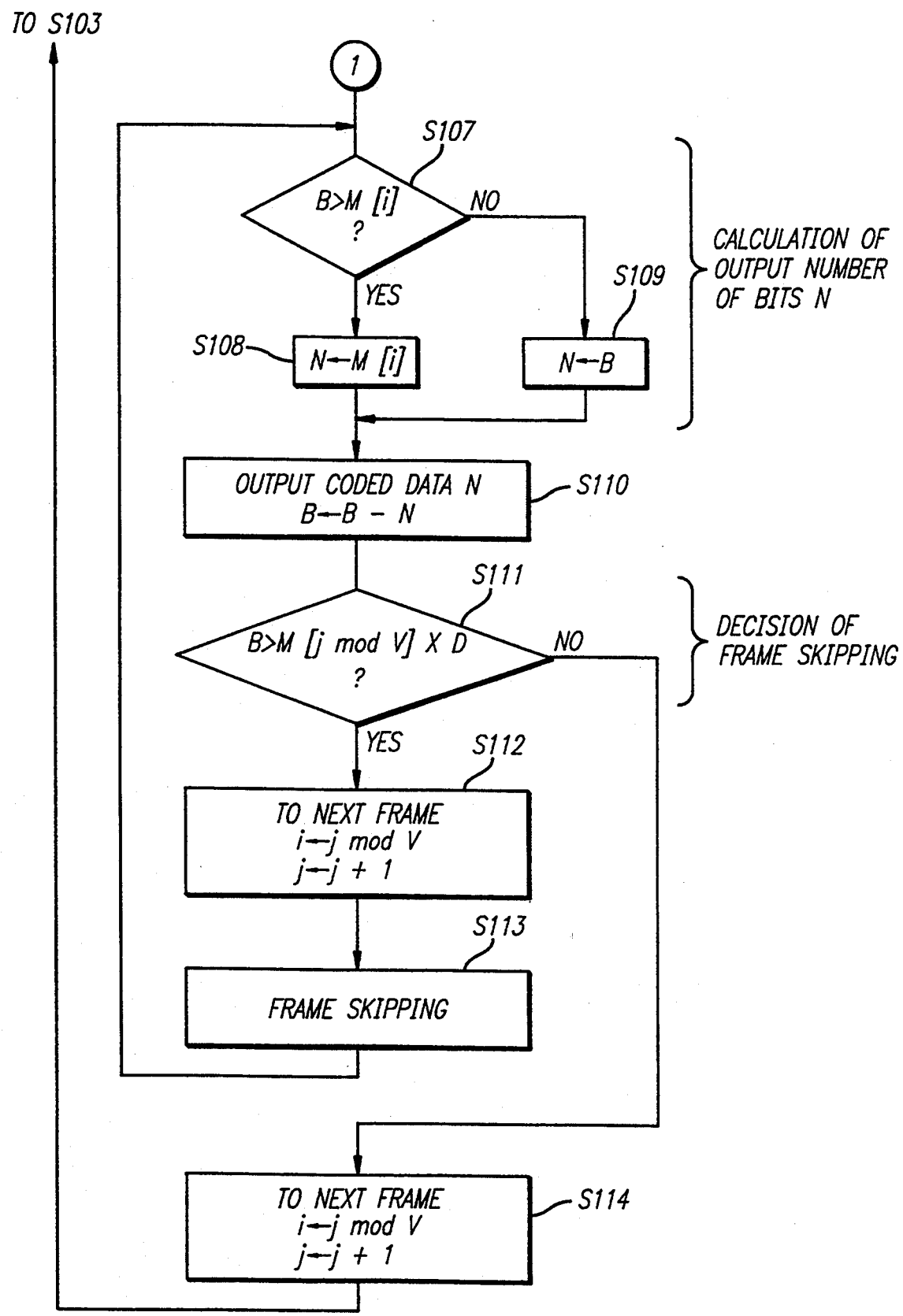
FIG. 8 is a second part of a flow chart of the video coding apparatus according to the first embodiment of the present invention.

FIGS. 7 and 8 show a flow chart of operation of the video coding apparatus according to the first embodiment of the present invention. In the target number of bits set section 14, the target number of bits M[i] for each successive frame is set (S101). Next, a storage number of bits B of the buffer, pointer i and j are initialized by "0" respectively (S102). It is assumed that a number of frames per second is F (frame/sec), the declared value of average bit-rate is R (bit/sec), the window size is W (number of frames) and a repeat period of change-over of predictive coding method and target number of bits is V (number of frames) (where V is an integer which is equal to or is a divisor of W, i.e., a divisor of W whose value is an integral number of frames). This relation is represented as follows.

$$\sum_{i=0}^{v-1} M[i] \leq V \cdot R/F \quad (5)$$

In the above formula, the left part is the target number of bits of coded data in V frames and the right part is the number of bits of coded data in V frames according to the declared value R. The above formula represents that there is a change-over period V (in frames) of predictive coding methods and that the target number of bits is set below the predetermined value (V.R/F).

In the coding method of each frame, an intra coding frame is an I picture, a forward decoding or intra coding frame is a P picture and a plural forward coding or intra coding frame is a P' picture. In general, the number of bits of each coding method is represented "I>P>P'". Therefore, the order of each frame and the target number of bits M[i] is previously set in accordance with these relationships. That is, the target number of bits for an I picture frame is greater than that for a P picture frame, which is in turn greater than that for a P' picture frame.

For example, it is assumed that the window size W=8 (frames), the declared value of average bit-rate R=9 (Mbit/sec) and the number of frames per second F=30 (frame). If 8 frames are coded as "I→P'→P→P-'→I→P'→P→P"' in order, the window size in bits is "[number of bits of I+ number of bits of P'+ number of bits of P+number of bits of P'+ number of bits of I+ number of bits of P'+ of bits of P+ number of bits of P']=8.9/30 (Mbit)". In this case, number of bits of I=16/30 (Mbit)
number of bits of P=8/30 (Mbit)
number of bits of P'=6/30 (Mbit)

Figure 9:
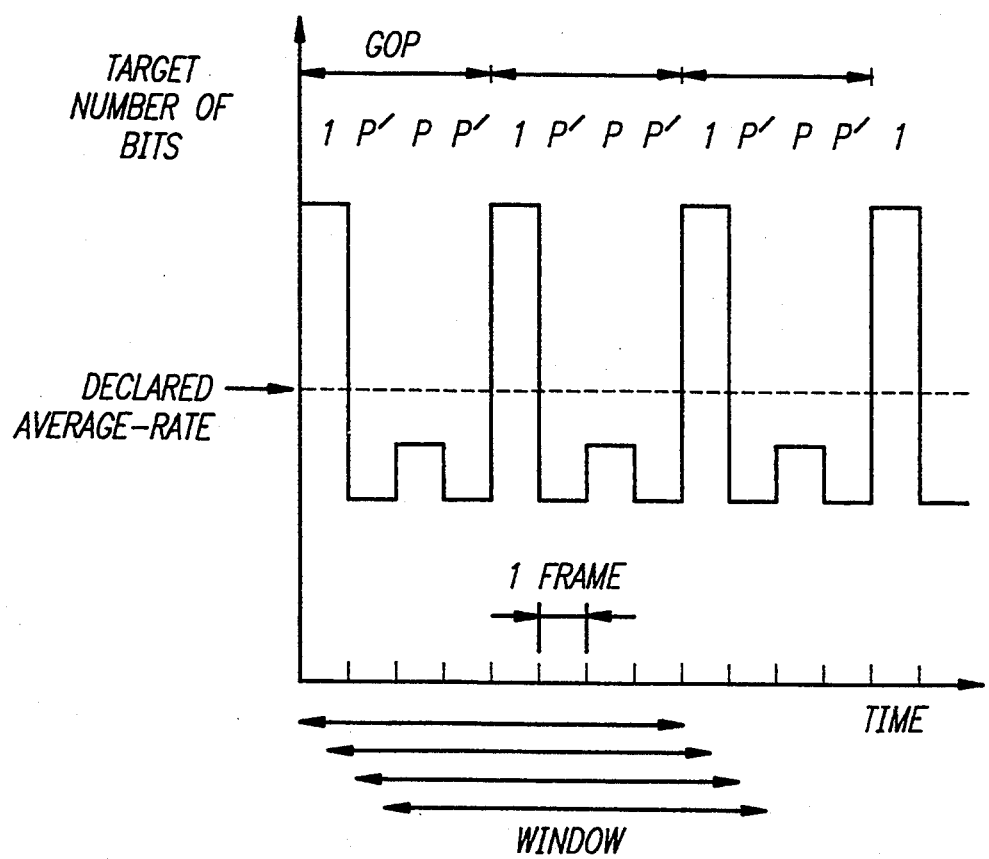
FIG. 9 is a time graph of a target number of bits according to the present invention.

When the frame is coded, the number of bits of coded data is set below the target number of bits M. As shown in FIG. 9, the frames are coded in order as "I→P'→P→P'→I→P'→P43 P'" and the coded data of each frame is transmitted at a different target number of bits for each frame respectively. Therefore, in the sliding window shown in FIG. 9, the average bit-rate in an 8-frame window is below 9 Mbit/sec.

In this example, as for the window size W=8 frames, the target number of bits M is set to repeat at a period of 4 frames. However, the target numbers of bits M may be set to repeat at a period V which is equal to or an integer divisor of the window size W (i.e., V may be selected so that V=1, 2, 4 or 8 frames).

The target number of bits set section 14 comprises a memory "M[i] (i=0, . . . , v−1)" which stores a target number of bits for each frame and pointer i which indicates the address of the memory The target number of bits of j−1th frame is read from the memory by the address of residue number "i" (i=(j−1) mod V).

Next, in the control target number of bits calculation section 15, the control target number of bits S is calculated by subtracting the storage number of bits B from the target number of bits of each frame M[i] (S104). In short, whenever the video signal is input at S103, the control target number of bits S is the difference between the stored number of bits B and the target number of bits M[i]. Then, in the coder 11, the input video signal is coded according to the control target number of bits S and the coded data is sent to the buffer 12 (S105~S106).

In the output number of bits calculation section 17, the output number of bits N is calculated by reference to the stored number of bits B and the target number of bits M[i] (S107~109). In this calculation, when the coded data is input to the buffer 12 (or after frame skipping), if the stored number of bits B is above the target number of bits M[i], the output number of bits N is equal the target number of bits M[i]. If the stored number of bits is below the target number of bits M[i], the output number of bits N is equal to the stored number of bits B. Information of the output number of bits N is then sent to the buffer 12. The buffer 12 receives the number of bits C of coded data from the coder 11 and transmits the output number of bits N (S110).

The frame skipping decision section 16 decides whether frame skipping is to be executed or not according to the stored number of bits B, the target number of bits M[j mod V] of the next frame and a decoding delay time D (S111). When the coded data is transmitted from the buffer 12, if the stored number of bits B is above the target number of bits M [j mod V] of the next frame corresponding to the decoding delay time D (B>M [j mod V]×D), the next frame is skipped without coding (S112~S113). If the stored number of bits B is below the target number of bits M [i mod V] of the next frame corresponding to the decoding delay time D (B≦M [j mod V]×D), the next frame is not skipped (S114).

The decoding delay time D is the time from the beginning time of coding at the coder to the beginning time of decoding at a decoder (not shown). The decoding delay time in frames is previously set as a limit (0≦D<1) between the coder and the decoder.

FIGS. 10A, 10B and 10C are time graphs of processing that occurs when the generated number of bits C of coded data is above the control target number of bits S. As illustrated in FIG. 10A, this occurs in frames (2) and (5). For example, in case that the decoder side decodes the coded data by a delay time of ½ frame (D=½ frame) as illustrated in FIGS. 10B and 10C, if the generated number of bits of coded data of the present frame are transmitted before ½ of the frame time of the next frame, the next frame is not skipped. The control target number of bits of the next frame is reduced by a number of bits equal to the difference between the target number of bits of the present frame and the generated number of bits of the present frame. This is the case at frame (2), and it can be seen in FIG. 10B that frame (3) is not skipped. If the generated number of bits of coded data of the present frame are not completely transmitted by ½ of the frame time of the next frame, the next frame is skipped and the bit difference between the target number of bits of the present frame and the generated number of bits of the present frame is transmitted at the next frame time, as shown at frame (5) in FIG. 10B. In FIG. 10B, at the coder side, frame (6) is skipped because the generated number of bits of frame (5) is above the target number of bits of frame (5) by an amount greater than ½ frame. Therefore, at decoder side in FIG. 10C, frame (5) is displayed late by one frame time and frame (4) is displayed repeatedly during two frame times.

(Second embodiment)

Figure 11:
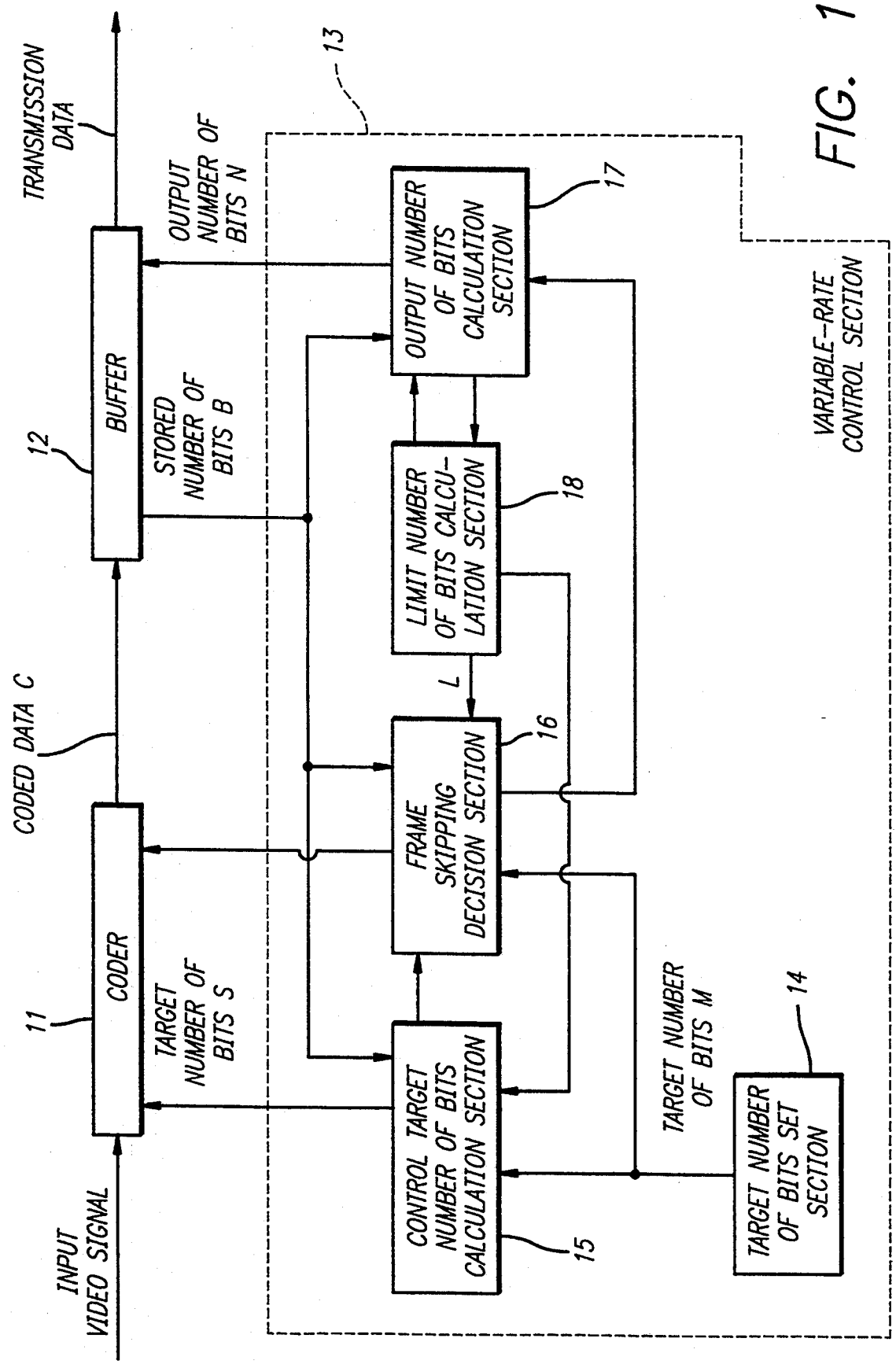
FIG. 11 is a block diagram of a video coding apparatus according to the second embodiment of the present invention.

FIG. 11 is a block diagram of video coding apparatus according to the second embodiment of the present invention. In the first embodiment, in the case that the generated number of bits of the frame is below the target number of bits, the difference is unused. In the second embodiment, this point is improved. In FIG. 11, the variable-rate control section 11 includes a limit number of bits calculation section 18. The limit number of bits L is the limit of the number of bits of coded data for each frame according to the restriction of the sliding window.

Figure 12:
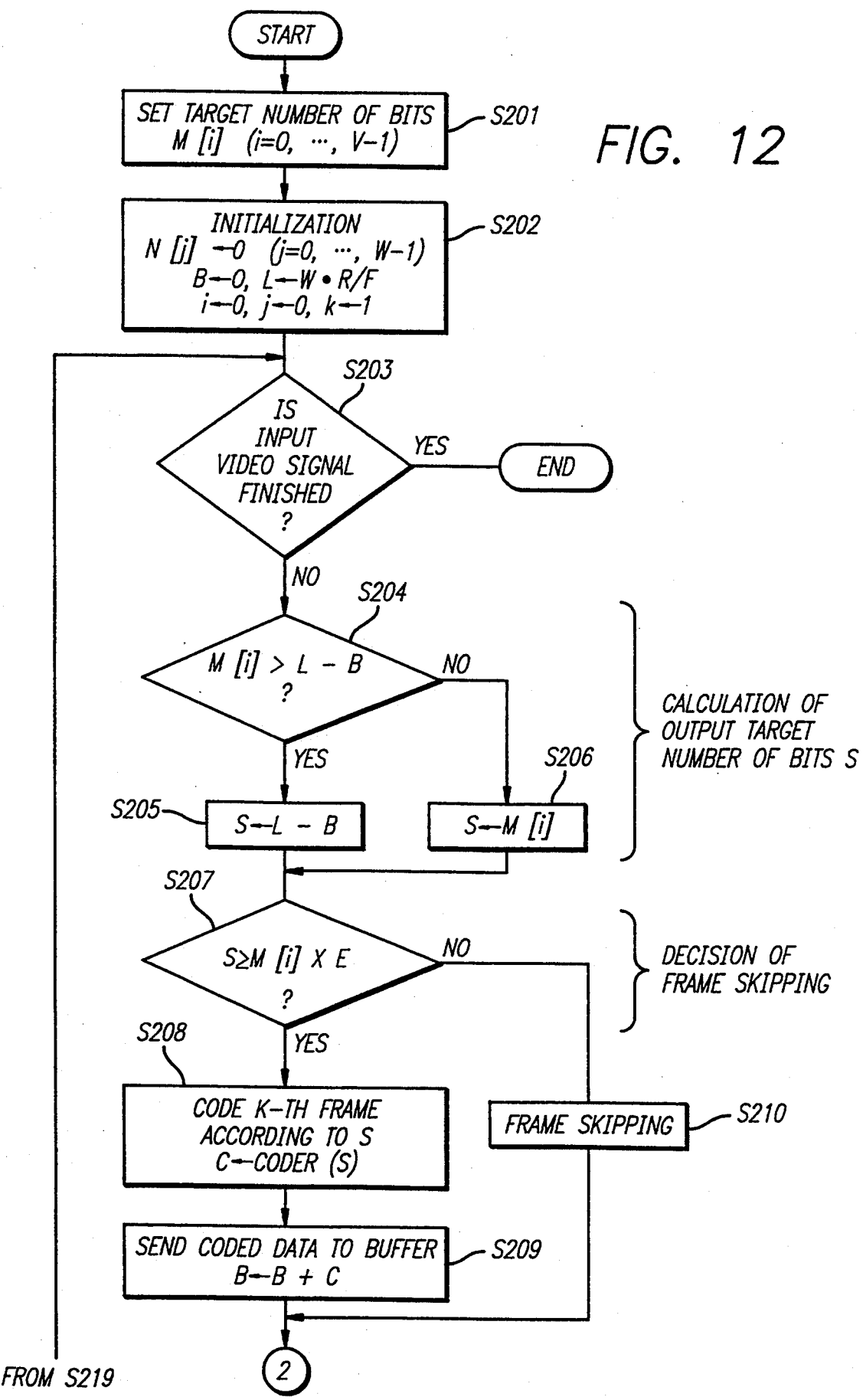
FIG. 12 is a first part of a flow chart of the video coding apparatus according to the second embodiment of the present invention.
Figure 13:
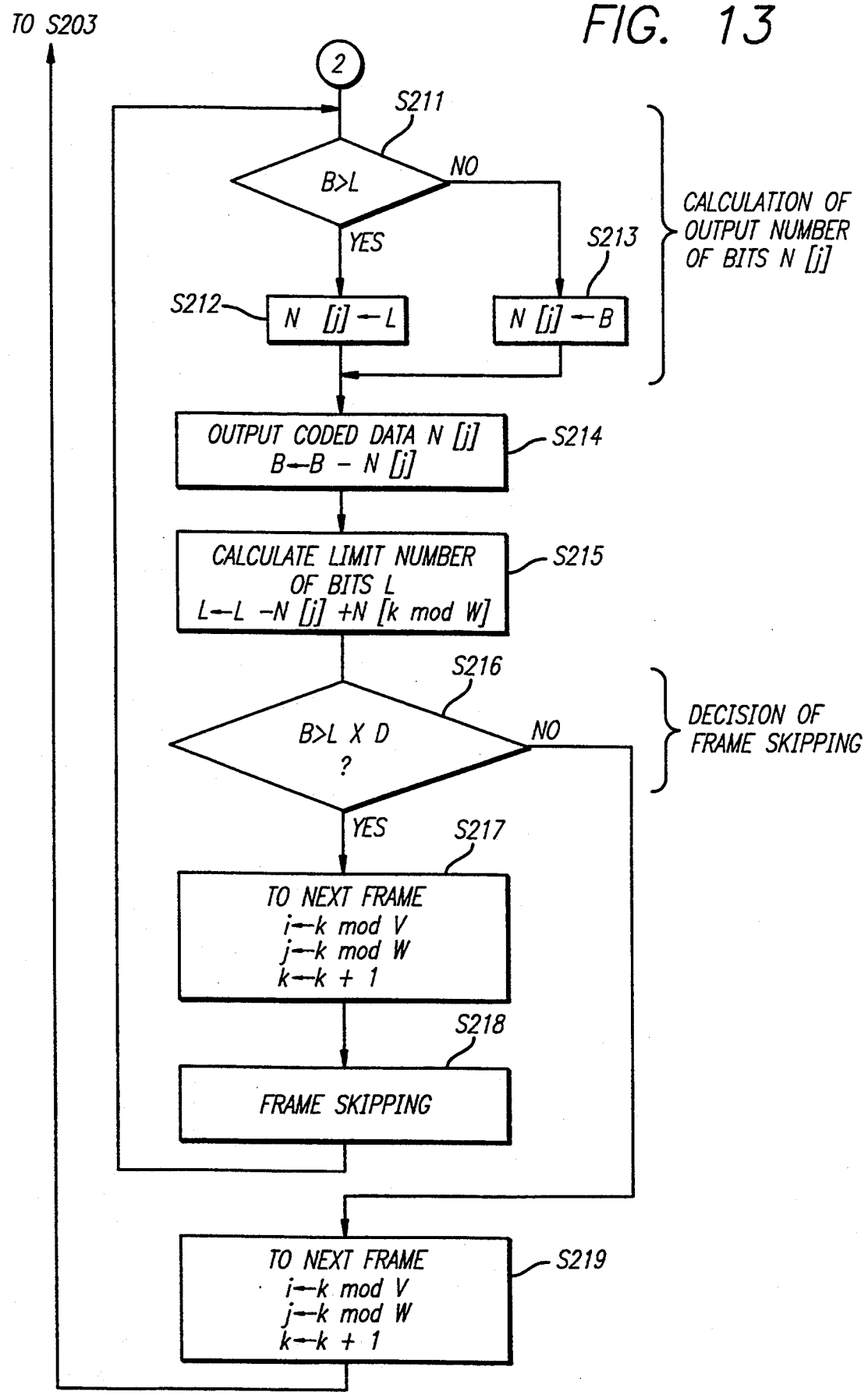
FIG. 13 is a second part of a flow chart of the video coding apparatus according to the second embodiment of the present invention.

FIGS. 12 and 13 show a flow chart of processing of the video coding apparatus according to the second embodiment. First, in the target number of bits set section 14, the target number of bits M of each frame is set (S201). Then, the output number of bits N, the stored number of bits B, pointers i and j are initialized by "0". The frame number K is initialized by "1". The limit number of bits L is initialized by "W.R/F" (S202).

Next, in the control target number of bits calculation section 15, the control target number of bits S is calculated by reference to the limit number of bits L, the stored number of bits B and the target number of bits M[i] of each frame. In this place, whenever the video signal is input at S203, the section 15 decides whether the target number of bits M[i] is above the difference between the limit number of bits L and the stored number of bits B or not (S204). If the target number of bits is above the difference, the control target number of bits S is the difference (S205). If the target number of bits is not above the difference, the control target number of bits S is the target number of bits M[i] (S206). The control target number of bits S is sent to the coder 11 to control the number of bits C of coded data.

Next, the frame skipping decision section 16 decides whether the frame should be skipped or not before the frame is coded (S207). If the control target number of bits S is above the multiplication result of a determined threshold $\epsilon(0\leq\epsilon<1)$ and the target number of bits M[i] (S≧M[i]×ε), the frame is not skipped and the coder 11 codes the frame according to the target number bits S (S208). The coded data is then sent to the buffer 12 (S209). If the control target number of bits S is not above the multiplication result (S<M[i]×ε), the frame is skipped (S210).

Next, in the output number of bits calculation section 17, the output number of bits N is calculated by reference to the stored number of bits B and the limit number of bits L. When the coded data is input to the buffer 12 (or after frame skipping), the section 17 decides whether the stored number of bits B is above the limit number of bits L or not (S211)(FIG. 13). If the stored number of bits B is above the limit number of bits L, the output number of bits N [j] is the limit number of bits L (S212). If the stored number of bits B is not above the limit number of bits L, the output number of bits N [j] is the stored number of bits B (S213). Information of the output number of bits N [j] is then sent to the buffer 12. The buffer 12 receives the number of bits C of coded data from the coder 11 and transmits the output number of bits (S214).

Next, in the limit number of bits calculation section 18, the limit value L of the number of bits is calculated under the restriction of the sliding window of the next frame by the output number of bits of the past (W−1) frames (S215). The limit number of bits calculation section 18 includes a memory N[j] (j=0, . . . , W−1) which stores the output number of bits N of the past W frames. In this memory, the output number of bits of k−1th frame is stored by address of a residue number j (j=(K−1)mod W).

The frame skipping decision section 16 decides whether the frame should be skipped or not (S216). When the coded data is transmitted from the buffer 12, if the stored number of bits B is above the limit number of bits L of the next frame corresponding to decoding delay time D (B>L×D), the next frame is skipped without coding (S217~S218). If the stored number of bits B is not above the limit number of bits L of the next frame corresponding to decoding delay time (B≦L×D), the next frame is not skipped (S219).

In the first embodiment, if the generated number of bits of the frame is below the target number of bits, the difference between the generated number of bits and the target number of bits is unused. In the second embodiment, however, if the generated number of bits of the frame is below the target number of bits, the difference information is memorized. Then, in a future frame, when the generated number of bits of the frame is above the target number of bits, the difference is used by calculating the limit number of bits.

(Third embodiment)

Figure 14:
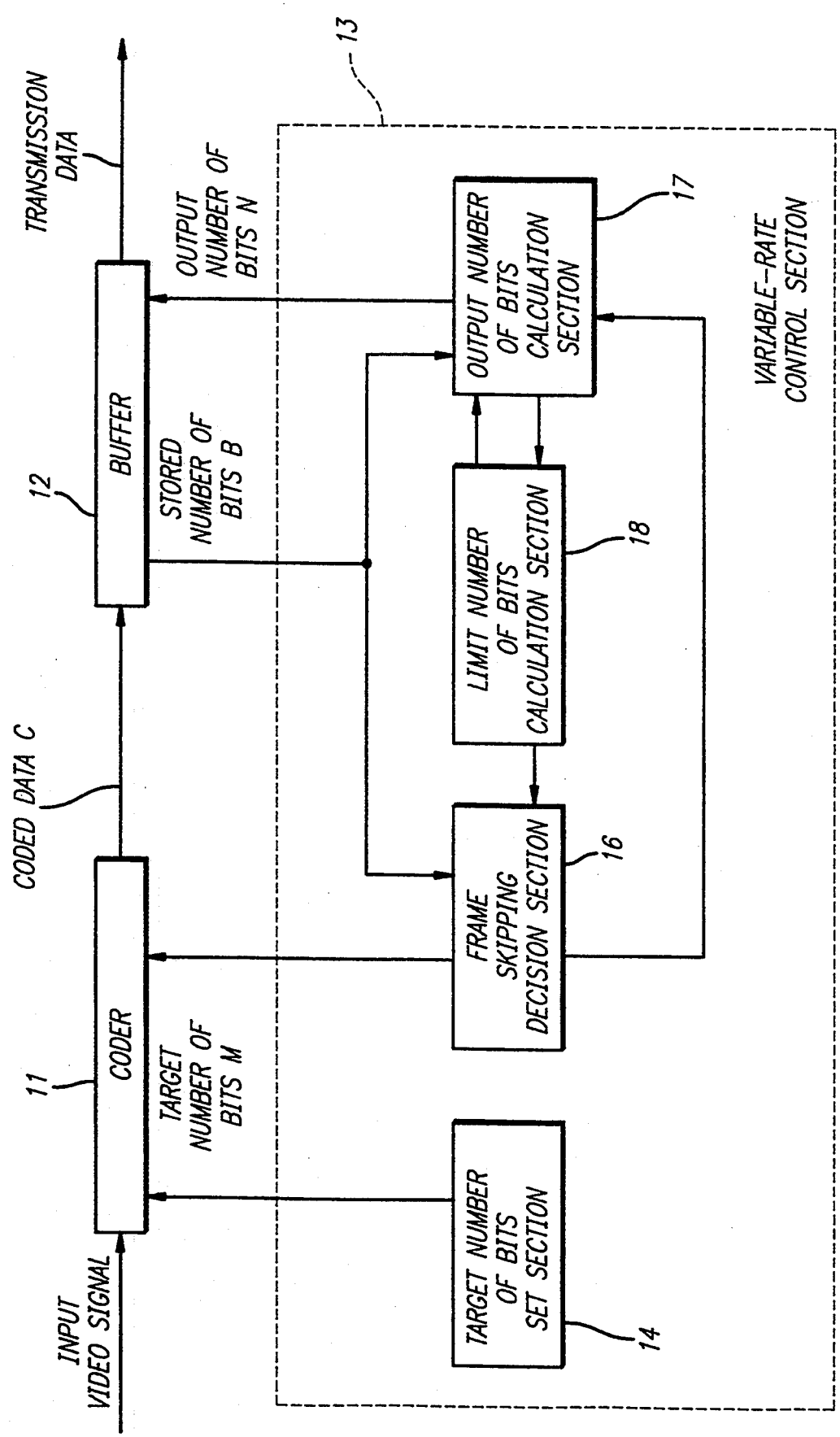
FIG. 14 is a block diagram of a video coding apparatus according to the third embodiment of the present invention.

FIG. 14 is a block diagram of video coding apparatus according to the third embodiment. In the first and second embodiments, if the generated number of bits of coded data of the frame is large, the next frame is skipped. But if an I picture or a P picture, which is used in predictive coding for another frame, is skipped, it is necessary for the coder 11 to change the predictive coding method. Therefore, in the third embodiment, frame skipping is only applied to a B picture and a P' picture which is not used for predictive coding of another frame. In FIG. 14, the control target number of bits calculation section 15 is removed from the variable-rate control section 13.

Figure 15:
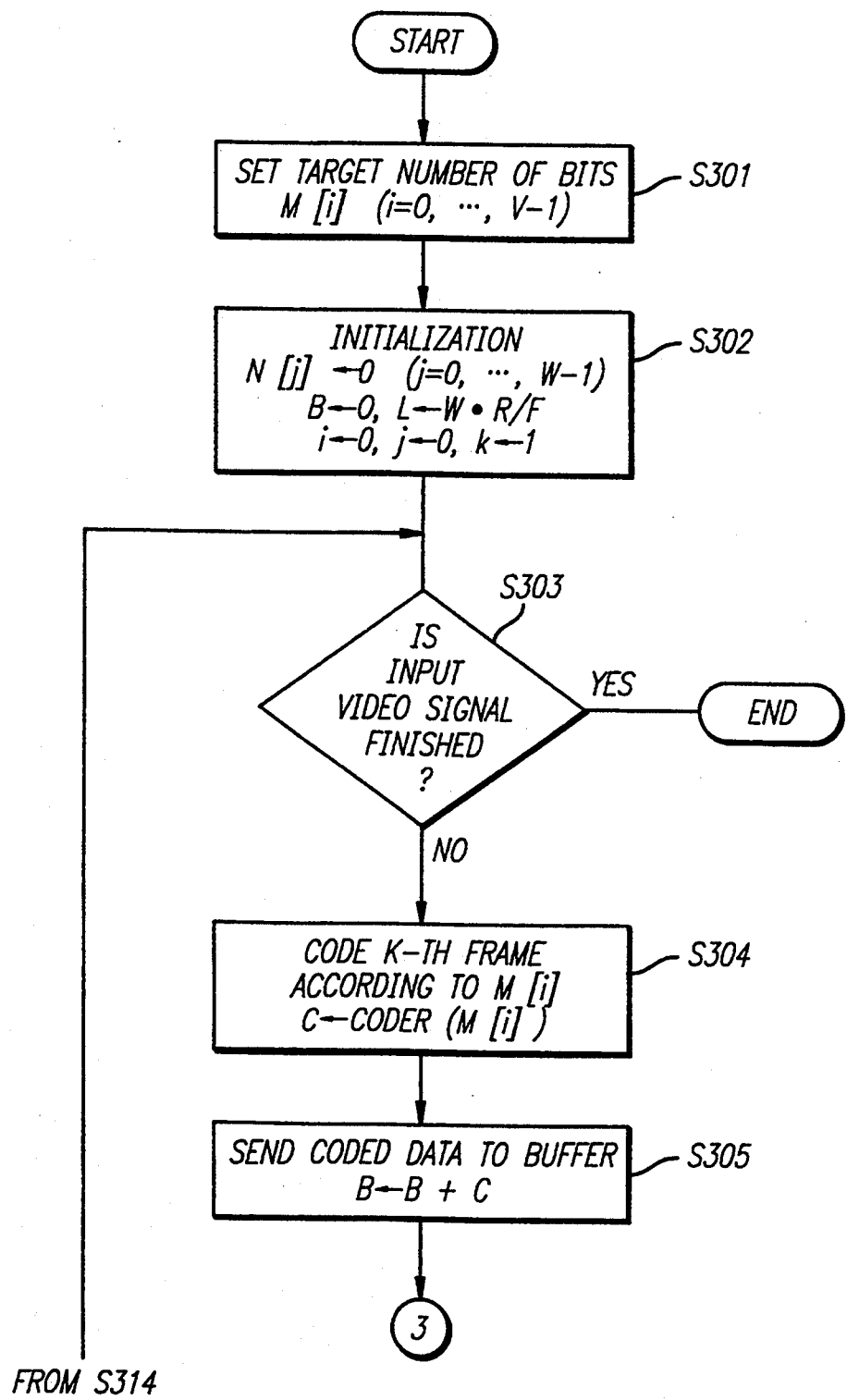
FIG. 15 is a first part of a flow chart of the video coding apparatus according to the third embodiment of the present invention.
Figure 16:
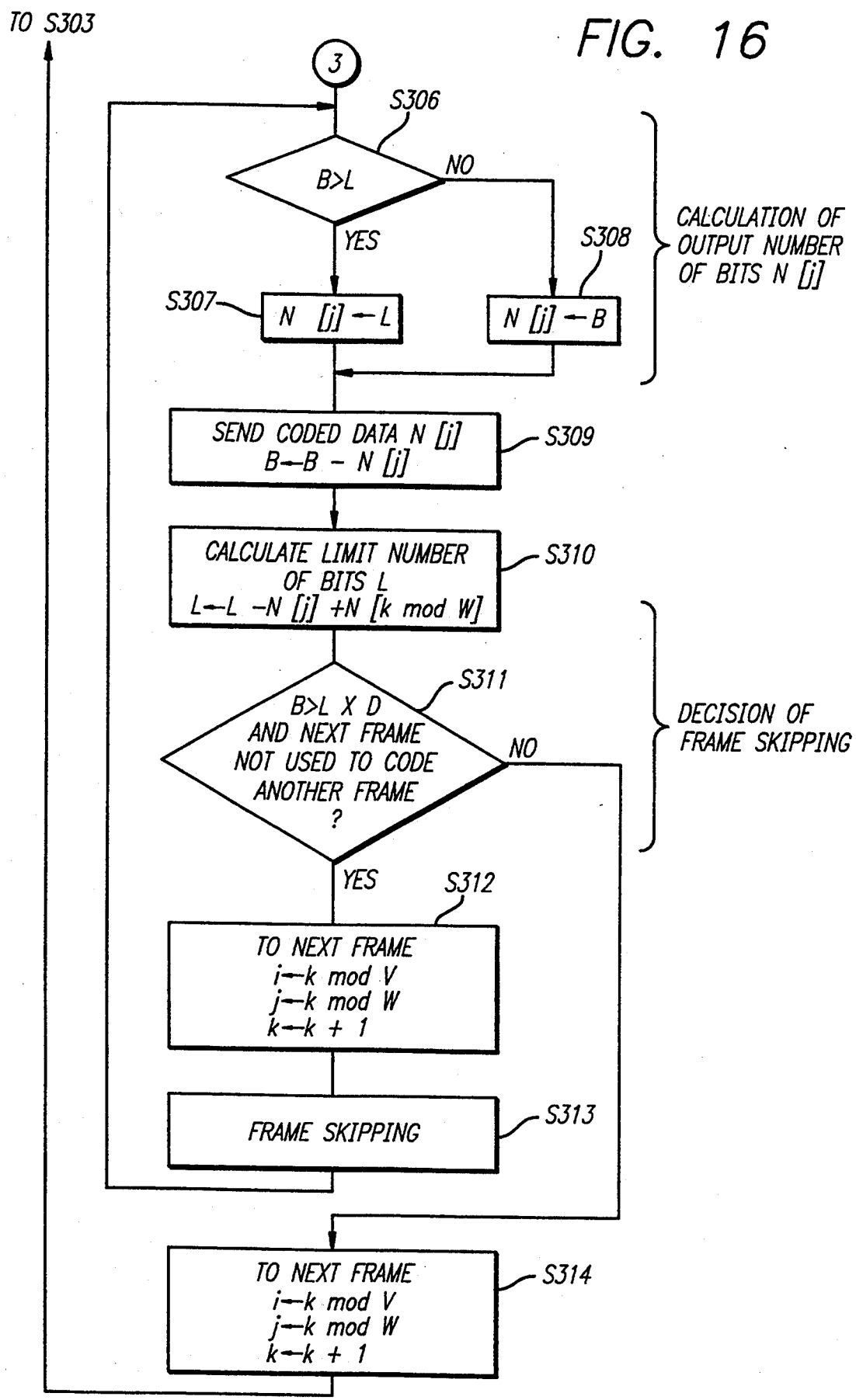
FIG. 16 is a second part of a flow chart of the video coding apparatus according to the third embodiment of the present invention.

FIGS. 15 and 16 show a flow chart of video coding apparatus according to the third embodiment. First, in the target number of bits set section 14, the target number of bits of each frame M is set (S301). The output number of bits M, the stored number of bits B, pointer i and j are initialized by "0" respectively. The frame number k is initialized by "1" and the limit number of bits L is initialized by "W.R/F" respectively (S302). Whenever the video signal is input to the coder 11, the coder 11 codes the video signal according to the target number of bits M (S303~S304). The coded data is sent to the buffer 12 (S305).

Next, the output number of bits calculation section 17 calculates the output number of bits N according to the stored number of bits B and the limit number of bits L. When the coded data is input to the buffer 12 (or after frame skipping), the section 17 decides whether the stored number of bits B is above the limit number of bits L or not (S306). If the stored number of bits B is above the limit number of bits L, the output number of bits N[j] is the limit number of bits L (S307). If the stored number of bits is not above the limit of bits L, the output number of bits N[j] is the stored number of bits B (S308). This information of the output number of bits N[j] is sent to the buffer 12. The buffer 12 receives the number of bits C of the coded data from the coder 11 and transmits the output number of bits N[j] of the coded data (S309).

The limit number of bits calculation section 18 calculates the limit value L of the number of bits of the coding data under restriction of sliding window for the next frame according to the output number of bits of the past (W−1) frames (S310). The frame skipping decision section 16 then decides whether the frame should be skipped or not (S311). When the coded data is output from the buffer 12, if the stored number of bits B is above the limit number of bits L for the next frame corresponding to the decoding delay time D(B>L×D) and the next frame is a P' picture or a picture, the next frame is skipped without coding (S312~S313). If the stored number of bits B is not above the limit number of bits L of the next frame corresponding to decoding delay time D(B≦L×D) or the next frame is not a P' picture or a B picture, the next frame is not skipped (S314).

In the third embodiment, the frame skipping is only applied to a frame which is not used for predictive coding of another frame. Therefore, the frame skipping does not affect any other frame's predictive structure.

What is claimed is:

1. A variable-rate video coding apparatus for maintaining a desired average bit-rate comprising:

coding means for coding an input video signal on a frame basis, according to plural different coding methods which vary over plural frames, wherein a sequence of the coding methods is repeated at a period of a certain number of frames which is equal to or a divisor of a window which contains predetermined plural frames and which has a declared average bit-rate; and control means for restricting the number of bits of the coded video signal in each window below the declared average bit-rate by setting a target number of bits which varies among frames in accordance with the type of coding method used for each respective frame and by restricting the number of bits of each frame below the target number of bits for each respective frame, and for calculating an output number of bits of the coded video signal in accordance with the target number of bits for each respective frame; and buffer means for temporarily storing the coded video signal on a frame basis and for transmitting the coded video signal in accordance with the output number of bits for each respective frame.

2. A video coding apparatus according to claim 1, wherein the control means calculates a control target number of bits by subtracting a stored number of bits of the buffer means from the target number of bits for a frame, and the coding means codes the video signal for respective frames according to the control target number of bits.

3. A video coding apparatus according to claim 2, wherein the control means compares the target number of bits with the stored number of bits, decides the target number of bits as the output number of bits if the target number of bits is below the stored number of bits and decides the stored number of bits as the output number of bits if the target number of bits is not below the stored number of bits.

4. A video coding apparatus according to claim 3, wherein the control means compares the stored number of bits with a multiplication result of a target number of bits of the next frame and a decoding delay time, and decides that the next frame will be skipped without coding if the stored number of bits is greater than the multiplication result.

5. A variable-rate video coding apparatus for maintaining a desired average bit-rate, comprising:

coding means for coding an input video signal on a field basis, according to plural different coding methods, wherein a sequence of the coding methods is repeated at a period of a certain number of fields which is equal to or a divisor of a window which contains predetermined plural fields and which has a declared average bit-rate;

control means for restricting the number of bits of the coded video signal in each window below the declared average bit-rate by setting a target number of bits which varies among fields in accordance with the type of coding method used for each respective field, and by restricting the number of bits of each field below the target number of bits for each respective field, and for calculating an output number of bits of the coded video signal in accordance with the target number of bits for each respective field; and buffer means for temporarily storing the coded video signal on a field basis and for transmitting the coded video signal in accordance with the output number of bits for each respective field.

6. A variable-rate video coding apparatus for maintaining a desired average bit-rate, comprising:

a coder for receiving a video signal and encoding the video signal in units of frames or fields, wherein the coder employs plural different coding methods for encoding respective units, wherein units are grouped into sliding windows formed of a predetermined number of units, wherein a sequence of coding methods is repeated at a period of a number of units by which each window is integrally divisible and wherein the windows have a declared average bit-rate; and a control circuit coupled to the coder for restricting the number of bits per window below the declared average bit-rate by reference to a target number of bits for each unit provided in accordance with the coding method for each respective unit, wherein the number of bits of each unit in the window is restricted below the target number of bits for each respective unit.

7. A video coding apparatus as in claim 6 further comprising a calculation circuit for calculating an output number of bits of the coded video signal in accordance with the target number of bits for each respective unit; and a buffer for temporarily storing the coded video signal on a unit basis and for transmitting the coded video signal in accordance with the output number of bits for each respective unit.

* * * * *